United States Patent

Tooyama

(10) Patent No.: US 9,877,347 B2
(45) Date of Patent: Jan. 23, 2018

(54) VEHICULAR COMMUNICATION APPARATUS AND RESET GUARD FUNCTION CONTROL PROGRAM PRODUCT

(71) Applicant: DENSO CORPORATION, Kariya, Aichi-pref. (JP)

(72) Inventor: Yoshihiro Tooyama, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/523,329

(22) PCT Filed: Dec. 11, 2015

(86) PCT No.: PCT/JP2015/006188
§ 371 (c)(1),
(2) Date: Apr. 28, 2017

(87) PCT Pub. No.: WO2016/098328
PCT Pub. Date: Jun. 23, 2016

(65) Prior Publication Data
US 2017/0238350 A1     Aug. 17, 2017

(30) Foreign Application Priority Data

Dec. 17, 2014 (JP) ................ 2014-255059

(51) Int. Cl.
*H04W 76/02* (2009.01)
*G07C 5/00* (2006.01)

(52) U.S. Cl.
CPC ............ *H04W 76/02* (2013.01); *G07C 5/008* (2013.01)

(58) Field of Classification Search
CPC ........ G07C 5/008; H04W 76/02; B60R 11/02; B60R 16/02; H04M 1/00
See application file for complete search history.

(56) References Cited

U.S. PATENT DOCUMENTS

| 2003/0050742 | A1* | 3/2003 | Sakamoto | ........ B60G 17/0195 701/1 |
| 2015/0066287 | A1* | 3/2015 | Daoud | .................. G07C 5/008 701/31.5 |
| 2015/0229604 | A1* | 8/2015 | Pal | ..................... H04L 61/2007 370/254 |

FOREIGN PATENT DOCUMENTS

JP    2009248711 A    10/2009

* cited by examiner

*Primary Examiner* — Devan Sandiford
(74) *Attorney, Agent, or Firm* — Harness, Dickey & Pierce, P.L.C.

(57) ABSTRACT

A vehicular communication apparatus includes a connector establishing connection with an external instrument, a wireless communicator performing wireless communication when a contract enabling the wireless communication is established, and an electronic control unit. The electronic control unit is capable of operating a failsafe function executing a reset when detecting an unestablished connection between the external instrument and the connector after startup and capable of operating a reset guard function when detecting that the vehicular communication apparatus starts while the contract enabling the wireless communication is unestablished. The electronic control unit determines whether the vehicular communication apparatus is under a pre-factory-shipment state that is before being shipped from a factory, when detecting that the vehicular communication apparatus starts while the contract enabling the wireless communication is unestablished, and prohibits operation of the reset guard function while determining that the vehicular communication apparatus is under the pre-factory-shipment.

5 Claims, 3 Drawing Sheets

VEHICULAR COMMUNICATION APPARATUS AND RESET GUARD FUNCTION CONTROL PROGRAM PRODUCT

CROSS REFERENCE TO RELATED APPLICATIONS

This application is a U.S. National Phase Application under 35 U.S.C. 371 of International Application No. PCT/JP2015/006188 filed on Dec. 11, 2015 and published in Japanese as WO 2016/098328 A1 on Jun. 23, 2016. This application is based on and claims the benefit of priority from Japanese Patent Application No. 2014-255059 filed on Dec. 17, 2014. The entire disclosures of all of the above applications are incorporated herein by reference.

TECHNICAL FIELD

The present disclosure relates to a vehicular communication apparatus and a reset guard function control program product.

BACKGROUND ART

Vehicular communication apparatuses have been known which perform wireless communications and establish connections with external instruments such as a navigation apparatus, to perform various services. This type of vehicular communication apparatus has a failsafe function to reset (self-reset) when detecting an unestablished connection with an external instrument after startup. Patent Literature 1 discloses a configuration of resetting a vehicular communication apparatus.

PRIOR ART LITERATURES

Patent Literature

Patent Literature 1: JP 2009-248711 A

SUMMARY OF INVENTION

The vehicular communication apparatus in normal usage (after the shipment from the factory) executes a failsafe function when detecting an unestablished connection with an external instrument after startup. In contrast, the vehicular communication apparatus, like a mobile phone, needs a contract to communicate with a wireless communication network. When the vehicular communication apparatus is caused to be reset during the contract process, inconsistency may occur between the apparatus and a server of a communication party for the contract. Thus a reset guard function is provided to the vehicular communication apparatus to be prohibited from being reset during the contract process.

The vehicular communication apparatus automatically starts the contract process upon startup in the non-contract status. Therefore, even during production of a vehicle incorporating the vehicular communication apparatus (before the shipment from the factory and during the non-contract status of the vehicular communication apparatus), the contract process is automatically started upon startup to operate the reset guard function. However, the reset guard function disables the failsafe function even when an unestablished connection with an external instrument is detected. This leads to an issue that the period of the unestablished connection continues between the vehicular communication apparatus and external instrument to cause false detection of connection failure.

An object of the present disclosure is to provide a vehicular communication apparatus and a reset guard function control program product that are capable of appropriately detecting connection failure between the apparatus and an external instrument.

According to an example of the present disclosure, a vehicular communication apparatus is provided to include a connector that establishes a connection with an external instrument, a wireless communicator that performs wireless communication when a contract enabling the wireless communication is established, and an electronic control unit. The electronic control unit is capable of operating a failsafe function to execute a reset, when detecting an unestablished connection between the external instrument and the connector after startup and capable of operating a reset guard function, when detecting that the vehicular communication apparatus starts while the contract enabling the wireless communication is unestablished. Herein the electronic control unit determines whether the vehicular communication apparatus is under a pre-factory-shipment state that is before being shipped from a factory, when detecting that the vehicular communication apparatus starts in a period in which the contract enabling the wireless communication is unestablished, and prohibits operation of the reset guard function while determining that the vehicular communication apparatus is under the pre-factory-shipment.

That is, the reset guard function is prohibited (suppressed) during production of a vehicle incorporating the vehicular communication apparatus and before shipment of the vehicular communication apparatus from the factory. The failsafe function thereby operates when an unestablished connection between an external instrument and a connector is detected through a test of the connection between the vehicular communication apparatus and the external instrument. Thus, false detection of the connection failure between the vehicular communication apparatus and external instrument can be prevented, and the connection failure can be detected appropriately.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
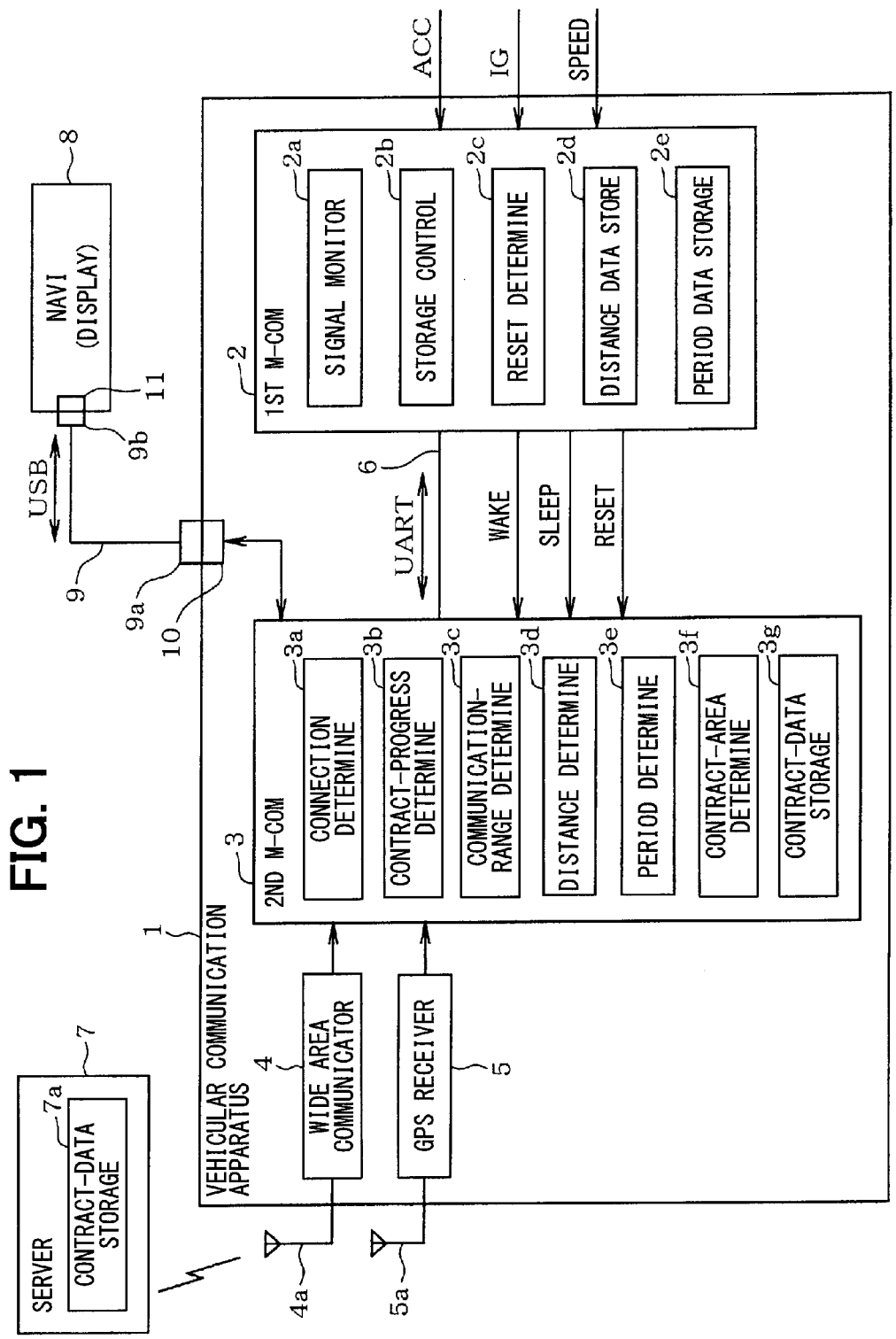
FIG. 1 is a functional block diagram illustrating an overall configuration of an embodiment.

Hereafter, an embodiment of the present disclosure is described with reference to the drawings. A vehicular communication apparatus 1 is a data communication module (DCM) that performs wide area communications (wireless communications). The vehicular communication apparatus 1 includes a first microcomputer 2, a second microcomputer 3, a wide area communicator 4 (equivalent to a wireless communicator), and a GPS (Global Positioning System) receiver 5. The vehicular communication apparatus 1 is connected to the first microcomputer 2 and second microcomputer 3 via a data communication line 6 based on a UART communication standard (Universal Asynchronous Receiver Transmitter) to enable data communications based on the UART communication standard.

The first microcomputer 2, which is also called a main microcomputer or a first electronic control unit, includes a CPU (Central Processing Unit), ROM (Read Only Memory), RAM (Random Access Memory), and I/O (Input/Output). The first microcomputer 2 includes a signal monitor section 2*a* (also equivalent to a signal monitor device or a signal monitor), a storage control section 2*b* (also equivalent to a storage control device or a storage controller), a reset determination section 2*c* (also equivalent to a reset determination device or a reset determiner), a distance data storage unit 2*d*, and a period data storage unit 2*e*. The signal monitor section 2*a*, storage control section 2*b*, and reset determination section 2*c* are configured by computer programs executed by the first microcomputer 2, and are realized by using software. In contrast, some or all of these sections can also be hardware. The distance data storage unit 2*d* and period data storage unit 2*e* are configured by storage regions of the first microcomputer 2.

The signal monitor section 2*a* monitors inputs of an ACC (accessory) signal, an IG (ignition) signal, and a vehicle speed pulse, respectively. The signal monitor section 2*a* monitors the input of the ACC signal while the first microcomputer 2 operates in the low power consumption mode. When detecting a switch of the ACC signal from off (0) to on (1), the signal monitor section 2*a* makes the first microcomputer 2 shift from the low power consumption mode to normal operation mode, and outputs a wakeup signal to the second microcomputer 3. The signal monitor section 2*a* monitors the input of the ACC signal while the first microcomputer 2 operates in the normal operation mode. When detecting a switch of the ACC signal from on to off, the signal monitor section 2*a* outputs a sleep signal to the second microcomputer 3, and makes the first microcomputer 2 shift from the normal operation mode to low power consumption mode. The signal monitor section 2*a* may use not only the ACC signal but also the IG signal. That is, when detecting a switch of the IG signal from off to on, the signal monitor section 2*a* may make the first microcomputer 2 shift from the low power consumption mode to normal operation mode, and output the wakeup signal to the second microcomputer 3. Additionally, when detecting a switch of the IG signal from on to off, the signal monitor section 2*a* may output the sleep signal to the second microcomputer 3, and make the first microcomputer 2 shift from the normal operation mode to low power consumption mode. When detecting a switchover of the first ACC signal from off to on, the signal monitor section 2*a* calculates a period elapsed from the first startup to the detection. When the first microcomputer 2 receives vehicle speed pulses during the normal operation mode, the signal monitor section 2*a* accumulates the number of the inputted vehicle speed pulses to calculate an accumulate travel distance.

The storage control section 2*b* maintains, in the distance data storage unit 2*d*, the accumulate travel distance calculated by the signal monitor section 2*a*. The storage control section 2*b* maintains, in the period data storage unit 2*e*, the elapsed period calculated by the signal monitor section 2*a*. The reset determination section 2*c* permits the output of a reset signal to the second microcomputer 3 when an output condition of the reset signal is satisfied (when a reset flag mentioned later is "1"). In contrast, the reset determination section 2*c* prohibits (controls) the output of the reset signal to the second microcomputer 3 when the output condition of the reset signal is not satisfied (the reset flag is "0"). Thus, the first microcomputer 2 functions also as a reset signal outputting part.

The second microcomputer 3 is also called a sub microcomputer or a second electronic control unit, and includes a CPU, a ROM, a RAM, and an I/O. The second microcomputer 3 at rest starts when receiving the wakeup signal from the first microcomputer 2 as a trigger. The second microcomputer 3 in operation stops when receiving the sleep signal from the first microcomputer 2 as a trigger. In this case, the vehicular communication apparatus 1 starts when the second microcomputer 3 starts, and the vehicular communication apparatus 1 stops when the second microcomputer 3 stops.

The second microcomputer 3 includes a connection determination section 3*a* (also equivalent to a connection determiner), a contract-progress determination section 3*b* (also equivalent to a contract-progress determiner), a communication-range determination section 3*c* (also equivalent to a communication-range determination device or a communication-range determiner), a distance determination section 3*d* (also equivalent to a distance determination device or a distance determiner), a period determination section 3*e* (also equivalent to a period determination device or a period determiner), a contract-area determination section 3*f* (also equivalent to a contract-area determination device or a contract-area determiner), and a contract-data storage unit 3*g*. The connection determination section 3*a*, contract-progress determination section 3*b*, communication-range determination section 3*c*, distance determination section 3*d*, period determination section 3*e*, and contract-area determination section 3*f* are configured by computer programs (including a reset guard function control program) executed by the second microcomputer 3 and realized by software. These sections can also be recorded on a non-transitory computer-readable storage medium as a reset guard function control program product including instructions that execute the reset guard function control, and be provided. The contract-data storage unit 3*g* is configured by a storage region of the second microcomputer 3.

The wide area communicator 4 is connected to a wide area communication antenna 4*a*, and performs wide area communications with a wide area communication network. In this case, a contract (for wide area communication) needs to be established between the vehicular communication apparatus 1 and a server (contract management center) 7 managed by a wide area communication carrier to perform communications between the apparatus and server. When a contract for the wide area communication is established between the vehicular communication apparatus 1 and server 7, the contract data indicating such a contract being established is stored to be maintained in both the contract-data storage unit 3*g* of the second microcomputer 3 and the contract-data storage unit 7*a* of the server 7. When catching a wide area wave emitted from a wide area communication station as a received wave through the wide area communication antenna 4*a*, the wide area communicator 4 calculates a received signal strength indicator (RSSI: Received Signal Strength Indicator) of the received wave, and outputs the calculated indicator to the second microcomputer 3.

The GPS receiver 5 is connected to a GPS antenna 5*a*. When catching a GPS signal emitted from a GPS satellite through the GPS antenna 5*a*, the GPS receiver 5 calculates latitude and longitude by calculating various parameters from the received GPS signal, and outputs the calculated latitude and longitude to the second microcomputer 3.

The above vehicular communication apparatus 1 is incorporated to a vehicle (automobile) with a navigation apparatus 8 (equivalent to an external instrument). A USB (Universal Serial Bus) connection is established between the vehicular communication apparatus 1 and navigation apparatus 8 by connecting a connection terminal 9a of a USB cable 9 to a connection terminal 10 (equivalent to a connector) of the vehicular communication apparatus 1 and the other connection terminal 9b to a connection terminal 11 of the navigation apparatus 8. The navigation apparatus 8 as well as the vehicular communication apparatus 1 starts when the ACC signal switches from off to on. That is, data communications through the USB are enabled between the vehicular communication apparatus 1 and navigation apparatus 8 normally connected to each other via the USB cable 9 when the ACC signal switches from off to on. In contrast, the data communications through the USB are disabled between the vehicular communication apparatus 1 and navigation apparatus 8 abnormally connected to each other via the USB cable 9 even when the ACC signal switches from off to on. When the data communications through the USB are disabled after the ACC signal switches from off to on, the navigation apparatus 8 displays a screen view indicating the disability on a display.

The connection determination section 3a determines a state of the USB connection between the vehicular communication apparatus 1 and navigation apparatus 8 when receiving the wakeup signal from the first microcomputer 2. Specifically, the connection determination section 3a compares voltage applied to a powerline of the connection terminal 10 to a reference for determining the state of the USB connection between the vehicular communication apparatus 1 and navigation apparatus 8. The connection determination section 3a specifies that the USB connection between the vehicular communication apparatus 1 and navigation apparatus 8 is normal when the voltage applied to the powerline of the connection terminal 10 is the reference or more. In contrast, the connection determination section 3a specifies that the USB connection between the vehicular communication apparatus 1 and navigation apparatus 8 is abnormal (not normal) when the voltage applied to the powerline of the connection terminal 10 is less than the reference. When specifying that the USB connection is abnormal, the connection determination section 3a outputs, to the first microcomputer 2 via the data communication line 6, an abnormal-connection notice indicating that the USB connection is abnormal. When receiving the abnormal-connection notice from the second microcomputer 3 and when the output condition of the reset signal is satisfied as above, the reset determination section 2c in the first microcomputer 2 outputs the reset signal to the second microcomputer. When receiving the reset signal from the first microcomputer 2, the second microcomputer 3 executes the reset (operates the failsafe function).

When determining whether the contract for the wide area communication is in progress and specifying that the contract is in progress, the contract-progress determination section 3b outputs a contract-in-progress notice to the first microcomputer 2 via the data communication line 6. The contract-in-progress notice enables specifying a period of the contract in progress. When receiving the contract-in-progress notice from the second microcomputer 3, the reset determination section 2c in the first microcomputer 2 outputs no reset signal to the second microcomputer 3 even when receiving the abnormal-connection signal from the second microcomputer 3 during the contract process. The second microcomputer 3 receives no reset signal from the first microcomputer 2 during the contract process to operate the reset guard function.

When starting without the contract for the wide area communication, the second microcomputer 3 automatically starts the contract process and operates the reset guard function. Thus, the vehicular communication apparatus 1 starts without the contract for the wide area communication in some processes during production of a vehicle incorporating the vehicular communication apparatus 1 (before the shipment from the factory). The vehicular communication apparatus 1 at each startup starts the contract process automatically and operates the reset guard function. However, the failsafe function does not operate due to operation of the reset guard function even when the USB connection with the navigation apparatus 8 is detected to be unestablished. Thus, the USB connection between the vehicular communication apparatus 1 and navigation apparatus 8 continues unestablished to cause a false detection of connection failure.

In this regard, the present disclosure solves the above issue by determining whether the vehicular communication apparatus has been shipped from the factory and by prohibiting operation of the reset guard function before the shipment from the factory. Specifically, the communication-range determination section 3c, distance determination section 3d, period determination section 3e, and contract-area determination section 3f are provided as a technique of determining whether the vehicular communication apparatus has been shipped from the factory. The present embodiment assumes a configuration where a domestically produced vehicle is used (sold) abroad. The domestic factory that produces vehicles incorporating the vehicular communication apparatus 1 is outside the wide area communication range and the contract area for the wide area communication. The period before the shipment from the factory includes a process that starts the vehicular communication apparatus 1 without the contract for the wide area communication and then tests the USB connection between the vehicular communication apparatus 1 and navigation apparatus 8.

The communication-range determination section 3c receives a received signal strength indicator of a received wave from the wide area communicator 4, and compares the received signal strength indicator to a reference for determining whether the position of the vehicular communication apparatus 1 is within the wide area communication range. The communication-range determination section 3c specifies that the position of the vehicular communication apparatus 1 is within the wide area communication range when the received signal strength indicator of the received wave is the reference or more, and specifies that the position of the vehicular communication apparatus 1 is outside the wide area communication range when the received signal strength indicator of the received wave is less than the reference.

The distance determination section 3d acquires an accumulate travel distance in the distance data storage unit 2d of the first microcomputer 2 via the data communication line 6, and determines whether the acquired accumulate travel distance is less than a constant distance. The period determination section 3e acquires a period elapsed from the first startup in the period data storage unit 2e of the first microcomputer 2 via the data communication line 6, and determines whether the elapsed period is less than a constant period. The constant distance as a criterion for the accumulate travel distance and the constant period as a criterion for the period elapsed from the first startup are values to certainly expect that the shipment from the factory is not yet executed, namely, values never reached before the shipment from the factory. These values are optionally settable by an operator in response to a production period and shipment period of the vehicle. When the accumulate travel distance expected to be reached until the shipment from the factory is 25 km and the elapsed period from the first startup is one week, the constant distance is set to 50 km, which is twice the expected distance, and the constant period is set to two weeks, which is twice the elapsed period.

The contract-area determination section 3f receives latitude and longitude from the GPS receiver 5, and compares the received latitude and longitude to a previously maintained contract area map to determine whether the position of the vehicular communication apparatus 1 is within the contract area of the wide area communication. The contract-area determination section 3f specifies that the position of the vehicular communication apparatus 1 is within the contract area of the wide area communication when the latitude and longitude is in the contract area of the contract area map, and specifies that the position of the vehicular communication apparatus 1 is outside the contract area of the wide area communication when the latitude and longitude is outside the contract area of the contract area map.

The second microcomputer 3 outputs at least either a reset permission instruction or a reset prohibition instruction, to the first microcomputer 2 based on each determination result of the communication-range determination section 3c, distance determination section 3d, period determination section 3e, and contract-area determination section 3f.

Figure 2:
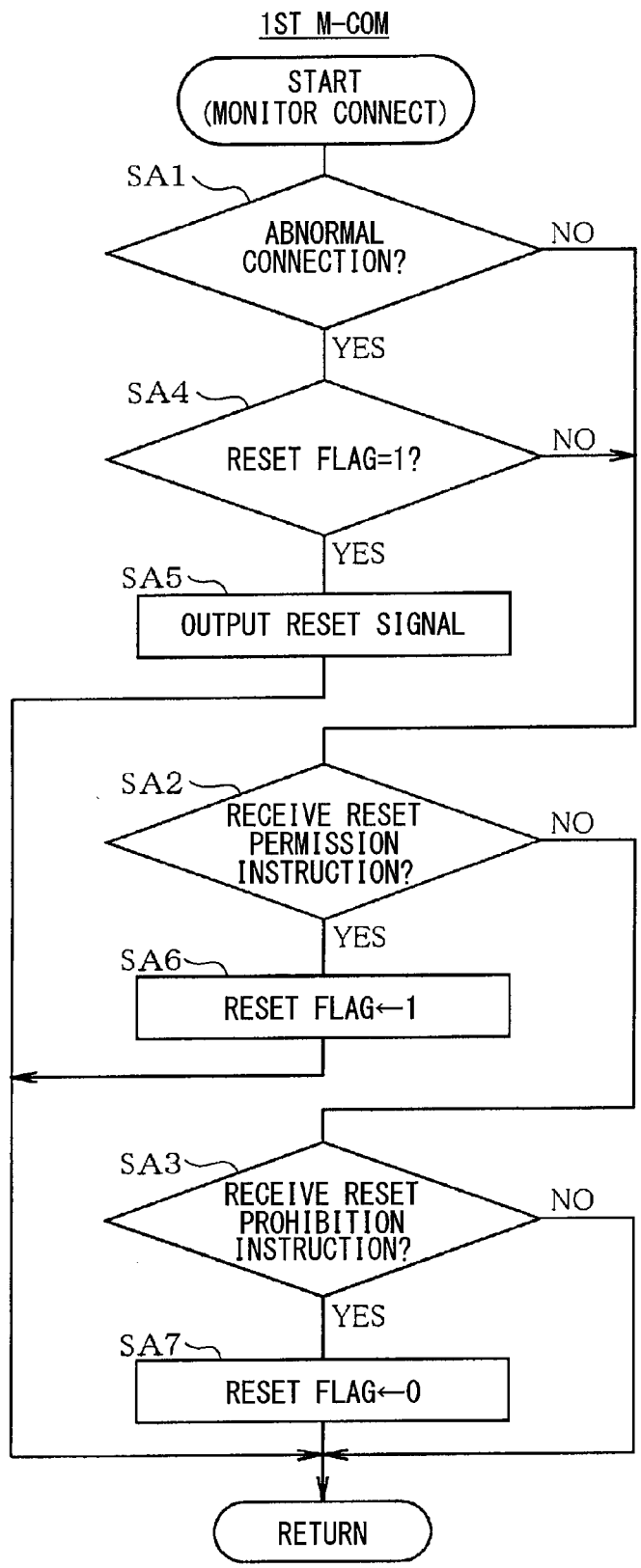
FIG. 2 is a flowchart illustrating processing of a first microcomputer.
Figure 3:
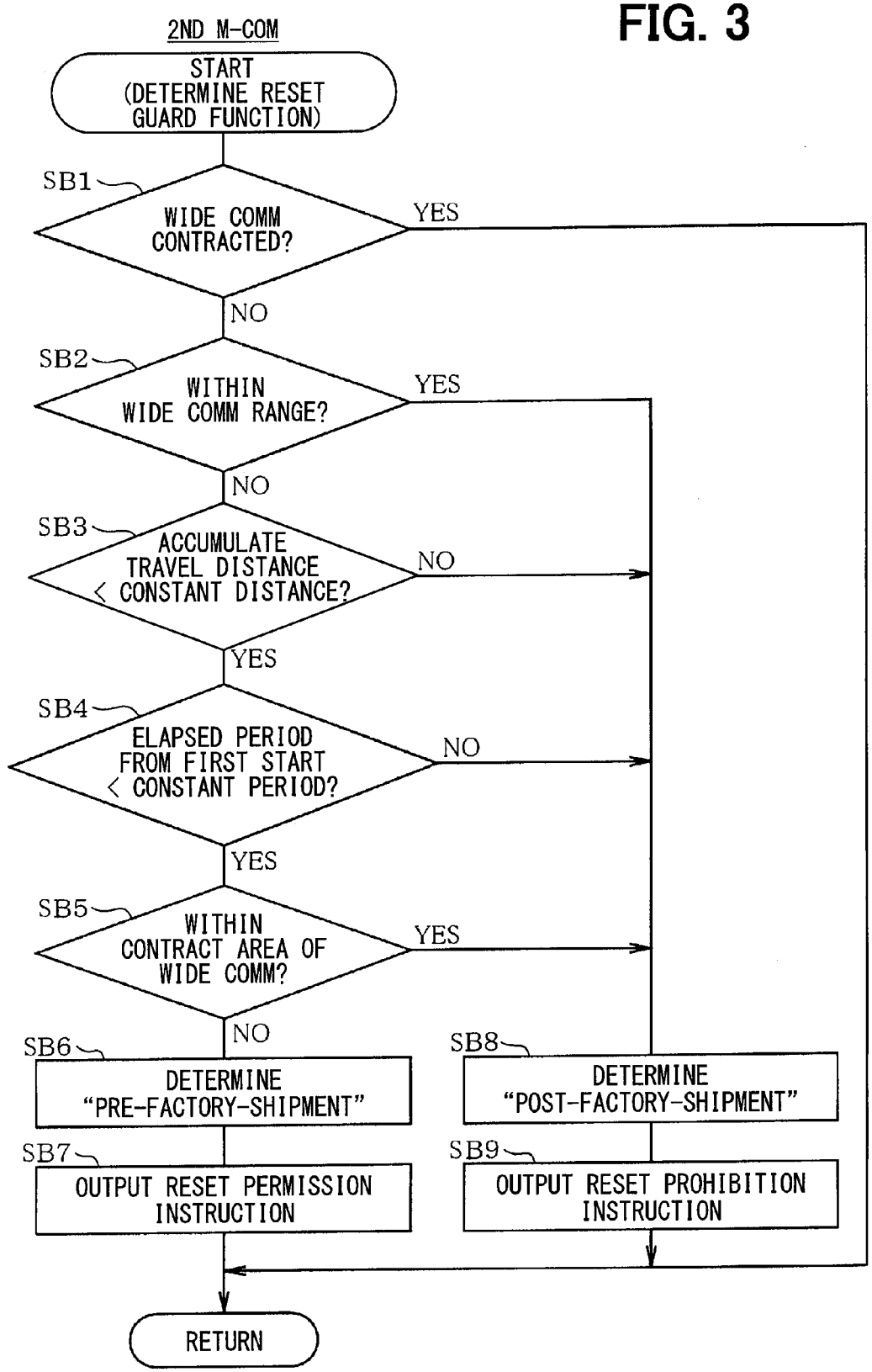
FIG. 3 is a flowchart illustrating processing of a second microcomputer.

Next, actions of the above configuration are explained with reference to FIGS. 2 and 3. In the present disclosure, the first microcomputer 2 performs connection monitoring in FIG. 2; the second microcomputer 3 performs reset guard function determination in FIG. 3. The processes are explained below.

It is noted that a flowchart or the processing of the flowchart in the present application includes sections (also referred to as steps), each of which is represented, for instance, as SA1, SB1. Further, each section can be divided into several sub-sections while several sections can be combined into a single section. Furthermore, each of thus configured sections can be also referred to as a device, module, unit, or a specific name (e.g., a detection section being referred to as a detection device, a detection module, a detection unit, or a detector). Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

(1) Connection Monitoring

The first microcomputer 2 shifts from the low power consumption mode to normal operation mode when detecting a switch of the ACC signal from off to on, and executes the connection monitoring periodically in a predetermined cycle (several milliseconds per cycle). When starting the connection monitoring, the first microcomputer 2 monitors failure of the USB connection between the second microcomputer 3 and navigation apparatus 8 and inputs of the reset permission instruction and reset prohibition instruction (SA1 to SA3). When determining the failure of the USB connection between the second microcomputer 3 and navigation apparatus 8 on reception of the abnormal-connection notice from the second microcomputer 3 (SA1: YES), the first microcomputer 2 determines whether the output condition of the reset signal is satisfied (SA4).

The first microcomputer 2 outputs the reset signal to the second microcomputer 3 (SA5) when setting the reset flag to "1" and determining that the output condition of the reset signal is satisfied (SA4: YES). In contrast, the first microcomputer 2 outputs no reset signal to the second microcomputer 3 when not setting the reset flag to "1" and when determining that the output condition of the reset signal is not satisfied (SA4: NO). When determining that the reset permission instruction is received from the second microcomputer 3 (SA2: YES), the first microcomputer 2 sets the reset flag to "1" (SA6). When determining that the reset prohibition instruction is received from the second microcomputer 3 (SA3: YES), the first microcomputer 2 sets the reset flag to "0" (SA7).

(2) Reset Guard Function Determination

When specifying the input of the wakeup signal from the first microcomputer 2, the second microcomputer 3 starts to periodically perform the reset guard function determination in a predetermined cycle (several milliseconds per cycle). When starting the reset guard function determination, the second microcomputer 3 determines whether the contract for the wide area communication is established (SB1, the first process). When determining that the contract-data storage unit 3g does not store contract data indicating the establishment of the contract for the wide area communication and that the contract is not established (unestablished) (SB1: NO), the second microcomputer 3 determines whether the vehicular communication apparatus 1 is shipped from the factory (SB2 to SB5, the second process). That is, the second microcomputer 3 determines a pre-factory-shipment state that is a state before the vehicular communication apparatus 1 is shipped from the factory (SB6) and outputs the reset permission instruction to the first microcomputer 2 (SB7) when determining all the conditions are satisfied including that: the position of the vehicular communication apparatus 1 is not within the wide area communication range; the accumulate travel distance acquired from the first microcomputer 2 is less than the constant distance; the elapsed period from the first startup acquired from the first microcomputer 2 is less than the constant period; and the vehicular communication apparatus 1 is not within the contract area of the wide area communication (SB2: NO, SB3: YES, SB4: YES, SB5: NO). At this time, when receiving the reset permission instruction from the second microcomputer 3 as above, the first microcomputer 2 sets the reset flag to "1" (SA6, the third process). That is, the second microcomputer 3 outputs the reset permission instruction to the first microcomputer 2 to prohibit the reset guard function.

In contrast, the second microcomputer 3 determines a post-factory-shipment state that is a state after the vehicular communication apparatus 1 is shipped from the factory (SB8), and outputs the reset prohibition instruction to the first microcomputer 2 (SB9) when determining that any of the conditions are satisfied including: the position of the vehicular communication apparatus 1 is within the wide area communication range; the accumulate travel distance acquired from the first microcomputer 2 is not less than the constant distance; the elapsed period from the first startup acquired from the first microcomputer 2 is not less than the constant period; and the position of the vehicular communication apparatus 1 is within the contract area of the wide area communication (SB2: YES, SB3: NO, 5B4: NO, SB5: YES). When receiving the reset prohibition instruction from the second microcomputer 3 at this time as above, the first microcomputer 2 sets the reset flag to "0" (SA7). That is, the second microcomputer 3 outputs the reset permission instruction to the first microcomputer 2 to permit operation of the reset guard function.

The first microcomputer 2 and second microcomputer 3 perform the above processes in cooperation with each other. The vehicular communication apparatus 1 thereby prohibits operation of the reset guard function before the shipment from the factory and permits operation of the reset guard function after the shipment from the factory. As above, the vehicular communication apparatus 1 is determined to be under the pre-factory-shipment state that is before being shipped from the factory when all the conditions are satisfied including that: the position of the vehicular communication apparatus 1 is not within the wide area communication range; the accumulate travel distance acquired from the first microcomputer 2 is less than the constant distance; the elapsed period from the first startup acquired from the first microcomputer 2 is less than the constant period; and the vehicular communication apparatus 1 is not within the contract area of the wide area communication. When at least one of these conditions is satisfied, the vehicular communication apparatus 1 may be determined to be under the post-factory-shipment state that is after being shipped from the factory.

As above, the present embodiment can provide the following effects.

The vehicular communication apparatus 1 prohibits operation of the reset guard function before the shipment from the factory. Thus, if an unestablished state is detected in testing the USB connection between the vehicular communication apparatus 1 and navigation apparatus 8, the failsafe function operates. This enables prevention of false detection of the connection failure with the navigation apparatus 8 and appropriate detection of the connection failure.

Additionally, the vehicular communication apparatus 1 is determined to be under the pre-factory-shipment state that is before being shipped from the factory when all the conditions are satisfied including that: the position of the vehicular communication apparatus 1 is not within the wide area communication range; the accumulate travel distance is less than the constant distance; the elapsed period from the first startup is less than the constant period; and the position of the vehicular communication apparatus 1 is not within the contract area of the wide area communication. Thus, the vehicular communication apparatus 1 can be certainly determined to be under the pre-factory-shipment state that is before being shipped from the factory.

The present disclosure is not limited to what has been illustrated in the above embodiment, and can be optionally modified or expanded without departing from the scope of the disclosure.

The present embodiment illustrates the navigation apparatus 8 as the external instrument. Any instrument connected to the vehicular communication apparatus 1 may be used as the external instrument. Additionally, the USB connection between the vehicular communication apparatus 1 and external instrument is illustrated. Other cable connections and wireless connections may be used.

The present embodiment illustrates two microcomputers, the first microcomputer 2 and the second microcomputer 3. One microcomputer may be provided.

The present embodiment illustrates the form where the domestically produced vehicle is to be used (sold) abroad. A form where a domestically produced vehicle is to be used domestically may also be applicable.

The present embodiment illustrates the criterions to determine that the vehicular communication apparatus 1 is under the pre-factory-shipment that is before being shipped from the factory. The criterions include that: the position of the vehicular communication apparatus 1 is not within the wide area communication range; the accumulate travel distance is less than the constant distance; the elapsed period from the first startup is less than the constant period; and the position of the vehicular communication apparatus 1 is not within the contract area of the wide area communication. Criterions other than these ones may be used. That is, any criterion may be used as long as it can be determined whether or not the vehicular communication apparatus 1 has been shipped from the factory.

The present embodiment illustrates the configuration where the vehicular communication apparatus 1 uses the wide area communication as the wireless communication, but may also include a configuration using local area communication.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular communication apparatus comprising:
   a connector that establishes a connection with an external instrument;
   a wireless communicator that performs wireless communication when a contract enabling the wireless communication is established; and
   an electronic control unit that is
      capable of operating a failsafe function to execute a reset, when detecting an unestablished connection between the external instrument and the connector after startup and
      capable of operating a reset guard function, when detecting that the vehicular communication apparatus starts while the contract enabling the wireless communication is unestablished,
   wherein the electronic control unit
      determines whether the vehicular communication apparatus is under a pre-factory-shipment state that is before being shipped from a factory, when detecting that the vehicular communication apparatus starts in a period in which the contract enabling the wireless communication is unestablished, and
      prohibits operation of the reset guard function while determining that the vehicular communication apparatus is under the pre-factory-shipment.

2. The vehicular communication apparatus according to claim 1,
   wherein
   the electronic control unit includes at least any one section of sections that are:
      a communication determination section that determines whether a position of the vehicular communication apparatus is within a range of the wireless communication;
      a distance determination section that determines whether an accumulate travel distance of a vehicle incorporating the vehicular communication apparatus is less than a constant distance;

a period determination section that determines whether an elapsed period from first startup of the vehicular communication apparatus is less than a constant period; and a contract-area determination section that determines whether a position of the vehicular communication apparatus is within a contract area of the wireless communication, wherein the electronic control unit determines that the vehicular communication apparatus is under the pre-factory-shipment state that is before being shipped from the factory, when determining that at least any one condition of conditions is satisfied, the conditions that are:

a condition that the position of the vehicular communication apparatus is not within the range of the wireless communication;

a condition that the accumulate travel distance of the vehicle incorporating the vehicular communication apparatus is less than the constant distance;

a condition that the elapsed period from the first startup of the vehicular communication apparatus is less than the constant period; and a condition that the position of the vehicular communication apparatus is not within the contract area of the wireless communication.

3. The vehicular communication apparatus according to claim 1, wherein the electronic control unit permits the operation of the reset guard function while determining that the vehicular communication apparatus is under a post-factory-shipment state that is after being shipped from the factory.

4. The vehicular communication apparatus according to claim 1, further comprising a reset signal output part that outputs a reset signal, wherein the electronic control unit executes the reset by receiving the reset signal, prohibits the operation of the reset guard function by permitting an output of the reset signal from the reset signal output part, and permits the operation of the reset guard function by prohibiting an output of the reset signal from the reset signal output part.

5. A reset guard function control program product stored in a non-transitory storage medium and including instructions executed by an electronic control unit serving as a computer included in a vehicular communication apparatus referred to as a subject apparatus including:

a connector that establishes a connection with an external instrument;

a wireless communicator that performs wireless communication when a contract enabling the wireless communication is established; and an electronic control unit that is capable of operating a failsafe function to execute a reset, when detecting an unestablished connection between the external instrument and the connector after startup and capable of operating a reset guard function, when detecting that the vehicular communication apparatus starts while the contract enabling the wireless communication is unestablished, the instructions comprising:

performing a subject-apparatus start determination that determines whether or not the vehicular communication apparatus as the subject apparatus starts while the contract enabling the wireless communication is unestablished;

performing a pre-shipment determination that determines whether or not the vehicular communication apparatus is under a pre-factory-shipment state that is before being shipped from the factory, when the subject-apparatus start determination determines that the vehicular communication apparatus starts while the contract enabling the wireless communication is unestablished; and performing an operation prohibition that prohibits an operation of the reset guard function in a period in which the pre-shipment determination determines that the vehicular communication apparatus is under the pre-factory-shipment state.

* * * * *